United States Patent
Nishiyama et al.

[11] Patent Number: 6,024,772
[45] Date of Patent: Feb. 15, 2000

[54] SOLID ELECTROLYTE CAPACITOR AND METHOD OF MANUFACTURING THE SAME

[75] Inventors: Toshihiko Nishiyama, Toyama; Isamu Uchida, Miyagi; Koji Sakata, Toyama, all of Japan

[73] Assignee: NEC Corporation, Tokyo, Japan

[21] Appl. No.: 09/093,620

[22] Filed: Jun. 9, 1998

Related U.S. Application Data

[62] Division of application No. 08/911,705, Aug. 15, 1997, Pat. No. 5,798,905.

[30] Foreign Application Priority Data

Aug. 16, 1996 [JP] Japan .................................. 8-216288

[51] Int. Cl.$^7$ ........................................... B21F 41/00
[52] U.S. Cl. .................................................. 29/25.03
[58] Field of Search ........................ 29/25.03; 361/540, 361/504, 525

[56] References Cited

U.S. PATENT DOCUMENTS

| | | | |
|---|---|---|---|
| 4,805,074 | 2/1989 | Harakawa et al. | 361/525 |
| 5,187,650 | 2/1993 | Kudoh et al. | 361/525 |
| 5,359,204 | 10/1994 | Eguchi et al. | 257/2 |
| 5,424,907 | 6/1995 | Kojima et al. | 361/525 |
| 5,586,000 | 12/1996 | Sakata et al. | 361/525 |
| 5,729,428 | 3/1998 | Sakata et al. | 361/523 |

FOREIGN PATENT DOCUMENTS

| | | |
|---|---|---|
| 2-74021 | 3/1990 | Japan . |
| 3-64013 | 3/1991 | Japan . |
| 3-64014 | 3/1991 | Japan . |
| 4-73924 | 3/1992 | Japan . |
| 4-56445 | 9/1992 | Japan . |

*Primary Examiner*—Brian Dutton
*Attorney, Agent, or Firm*—Sughrue, Mion, Zinn, Macpeak & Seas, PLLC

[57] ABSTRACT

An oxide film 2 which is so modified as to hold hydrophobic groups 3 on its surface, and further to stabilize an anionic substance 6 among those hydrophobic groups, has an electroconductive polymer layer 7 formed thereupon. The method by which to adhere the hydrophobic groups 3 and anionic substance 6 onto the surface of the oxide film comprises exposing an element upon which the oxide film has been formed, to a steam of the hydrophobic group or to a solution containing the hydrophobic group, and then exposing the same element to a steam of the anionic substance or to a solution containing the anionic substance. This method allows a hydrophobic group and anionic substance to be applied thinly and evenly on the surface of an oxide film, regardless of the kind and nature of the hydrophobic group and anionic substance.

8 Claims, 4 Drawing Sheets

SOLID ELECTROLYTE CAPACITOR AND METHOD OF MANUFACTURING THE SAME

This is a divisional of application Ser. No. 08/911,705 filed Aug. 15, 1997 now U.S. Pat. No. 5,798,905.

BACKGROUND OF THE INVENTION (1) Field of the Invention

This invention relates to a solid electrolyte capacitor, and more particularly to the capacitor having a electroconductive polymer as a solid electrolyte, and its manufacturing method.

(2) Description of the Related Art

The solid electrolyte capacitor having an anode body of a valve metal such as tantalum and aluminum has been widely used. It is possible for such as electrolyte capacitor to enlarge the area of its dielectric layer by preparing the dielectric using such an anode body as a sintered body or an etched foil, and thus to have a relatively large capacity in spite of a small size. It is disadvantageous, however, in that it gives a high impedance when exposed to a radio frequency because it uses manganese dioxide or ethyleneglycol as an electrolyte.

Recently, electric appliances become compact, and come to have multiple functions. In such a tendency, digitalization is introduced widely and demand for capacitors with an excellent performance in high frequency range has been intensified. To meet such demand new capacitors have been developed that incorporate, as a solid electrolyte, an electroconductive polymer having a conductivity several hundreds times as high as that of conventional ones. As one of such electroconductive polymer may be mentioned a compound which is produced after a dopant has been added to a complex, five-membered ring compound such as polypyrrol. The resulting electrolyte capacitor has an excellent frequency characteristics that has never been achieved by previous solid electrolyte capacitors. One of such capacitors is disclosed in Japanese Examined Patent Publication No. 4-56445.

Generally, the solid electrolyte capacitor which incorporates such an electroconductive polymer is superior not only in ESR (equivalent series resistance) characteristics and capacitance property, but in reliability to conventional capacitors. Take, for example, a conventional electrolyte capacitor which incorporates, as an electrolyte, manganese dioxide which has been produced through thermal cracking. The new solid electrolyte dispenses with the use of thermal treatment for its formation, and hence its oxide film is free from damages due to heating.

Applying an electroconductive polymer layer on an oxide film can be achieved by two methods: one is chemically oxidized polymerization and the other is electrolytically oxidized polymerization. Electrolytically oxidized polymerication is achieved by applying firstly a thin coat of an electroconductive polymer obtained through chemically oxidized polymerication, or of manganese dioxide on an oxide film to serve as a precoat, and then by resorting to electrolytically oxidized polymerization, using the precoat as an electroconductive layer. The reason why such precoat is prepared lies in that the oxide film, being an insulating body, can not transfer electric charges. Through above procedure, the electrolytically oxidized polymerization can produce a layer of an electroconductive polymer with a sufficient thickness.

The solid electrolyte capacitor incorporation such electroconductive polymer is advantageous in that its solid electrolyte has a low resistance. Therefore, various modifications have been added to that capacitor to ameliorate other characteristics in addition conductivity, thus to improve its overall utility.

For example, in Japanese Unexamined Patent Publication No. 3-64013 or No. 3-64014 is disclosed a solid electrolyte capacitor which has a surfactant inserted between an oxide film acting as a dielectric and an electroconductive polymer acting as a solid electrolyte, to form an electroconductive polymer layer evenly and efficiently on the surface of an oxide film, an object which is shared by the present inventors. To put it in more detail, the surfactant facilitates adherence of a polypyrrol polymer to the surface of the oxide film, thereby ensuring firm adherence of the pyrrol oligomers close to the surface of the oxide film thereto, and thus efficient and even formation of the electroconductive layer on the surface of the oxide film. This constitution will prevent deterioration of the capacitance and maximum durable voltage, and improve tan $\delta$.

Or in Japanese Unexamined Patent Publication No. 2-71021 or No. 7-73924 is disclosed a solid electrolyte capacitor which has, like the foregoing, a silan coupling agent, titanium coupling agent or aluminum coupling agent inserted between a dielectric oxide film and an electroconductive polymer layer. These two inventions intends to provide a solid electrolyte capacitor comparatively free from deterioration or loss of capacity and performance under high temperatures, by taking advantage of the property of those coupling agents which can improve the affinity between the oxide membrane and electroconductive polymer. These inventions thus intends to provide a solid electrolyte capacitor reliable even under a high-temperature environment, thereby to meet one of the demands often directed to this type of capacitors.

As described above, a method whereby, in a solid electrolyte capacitor incorporating an electroconductive polymer as a solid electrolyte, the adhesiveness of an oxide film is improved and an electroconductive polymer layer is efficiently and evenly formed on the surface of the oxide film is disclosed in Japanese Unexamined Patent Publication Nos. 3-64013 and 3-60414. The present inventors made a detailed study on the formation of an electroconductive polymer close to the surface of an oxide membrane, and found that the methods disclosed in above publications only improves adherence of oligomers close to the surface of the oxide film to that surface, the method is limited in applicability because it is ineffective to oligomers which form apart from the surface of the oxide film, and the method allows compounds too immature to be electroconductive to exist on the surface of the oxide film.

Figure 4A:
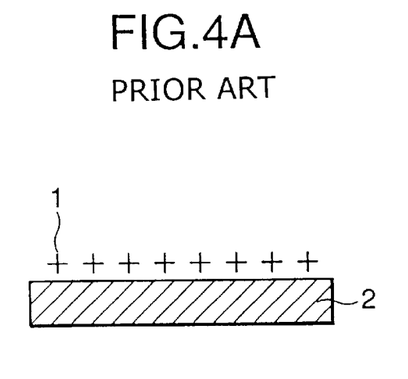
FIGS. 4A to 4C show schematic cross-sections of a capacitor element prepared by a conventional method to illustrate the physicochemical state of an oxide membrane when an electroconductive polymer layer is formed thereupon.
Figure 4B:
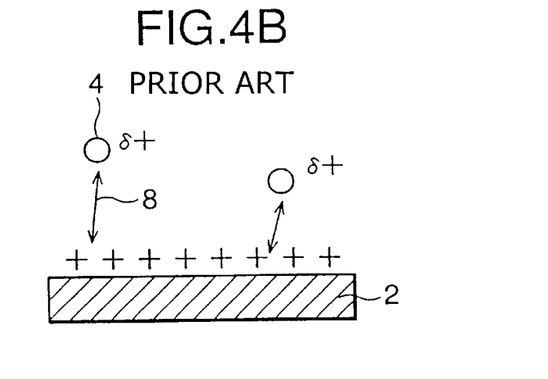
Figure 4C:
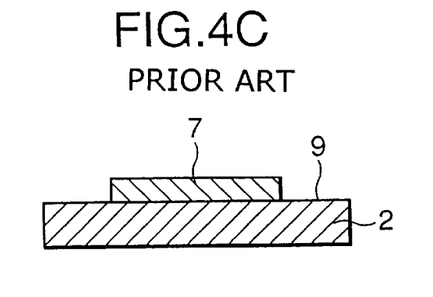

As shown in schematically in FIG. 4A, on the surface of an oxide film or an insulator exist a positive zeta potential 1. When an electroconductive polymer layer 7 is formed on the oxide film 2, polymerization reaction proceeds through positive radicals 4, and hence a repellent force is generated, as shown in FIG. 4B, between the polymerizing compound and the oxide film. Accordingly, polymerization proceeds at sites in the solution apart from the oxide film, effective polymerization does not take place close to the surface of the oxide film, and there are places (immature polymer clusters 9) where the compound does not undergo polymerization sufficiently to form an electroconductive body.

When an immature polymer cluster develops on the surface of the dielectric oxide film, it may cause three problems described below.

The first problem is inability to obtain a specified capacity. An oxide film upon which an electroconductive layer is not formed can not work as a dielectric, and thus is not possessed of a capacity. Accordingly, to obtain a specified amount of capacity, it becomes necessary to use a larger amount of tantalum powder than is normal, which will lead to an augmented production cost and enlarged volume of the resulting capacitor.

Figure 5:
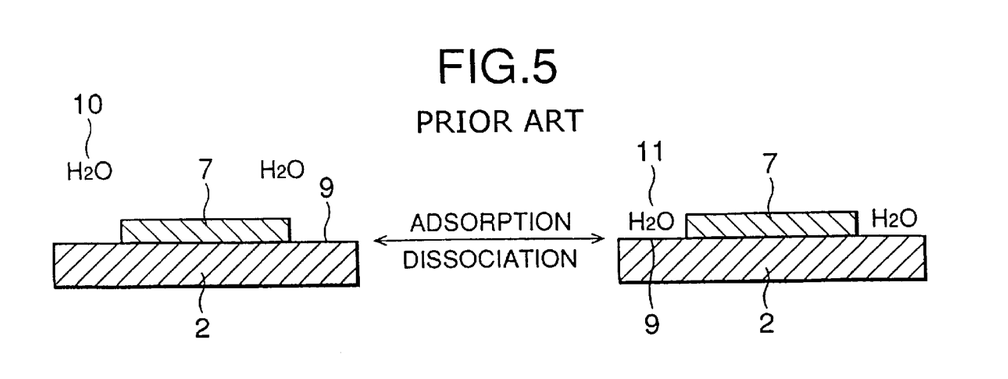
FIG. 5 shows a solid electrolyte capacitor prepared by a conventional method, and illustrate what physicochemical changes will take place when it is exposed to an atmosphere.

The second problem is bigger changes in capacity when the capacitor is exposed to an atmosphere, or especially to a humid atmosphere. As shown in FIG. 5, to the surface of an oxide film upon which immature polymer cluster 9 is present (or no electroconductive layer is formed), moisture 10 in the atmosphere reversibly attaches and detaches according to changes in temperature and humidity. When moisture adheres to the oxide film, the capacitance increases because the moisture acts as an electrode. On the contrary, when moisture detaches from the oxide film, the capacitance decreases. This is the reason why the capacitance changes greatly in such capacitor. The capacitor with such characteristics is unsuitable to be applied for a circuit which requires a high stability in capacitance such as a time-constant circuit.

The third problem is lowered reliability. Generally speaking, an oxide film upon which no electroconductive layer is formed is sensitive to changes in impurities ions contained in moisture in the atmosphere for the same reason as discussed above. To put it specifically, when moisture invades the oxide film where no electroconductive layer is formed, anions such as chloride contained in the moisture migrate into the substance of the oxide film which may lead to disorders such as lowered insulation. This in turn results in lowered reliability of the capacitor, and further in lowered reliability of the circuit which incorporates such capacitor.

SUMMARY OF THE INVENTION

In view of above, this invention intends, in the fabrication of a solid electrolyte capacitor with an electroconductive polymer as a solid electrolyte, to reduce the formation of immature polymer clusters on an oxide film, by forming the electroconductive polymer efficiently and evenly on the surface of the oxide membrane.

The solid electrolyte capacitor of this invention comprises a valve metal such as tantalum or aluminum as an anode body and an electroconductive polymer as a solid electrolyte, and is characterized by applying at least two layers onto the oxide film to act as a dielectric of the capacitor: one layer includes a compound with a hydrophobic group and an anionic substance, and the other to overlay the former is an electroconductive compound layer to act as a solid electrolyte.

Such a solid electrolyte capacitor is produced by a method which consists of applying an electroconductive polymer layer to act as a solid electrolyte onto an oxide film to act as a dielectric, and which further consists of modifying the surface of the oxide film with a hydrophobic group, before polymerizing monomers on the oxide film thereby to form an electroconductive polymer layer thereupon, inserting anionic substances among the hydrophobic groups, and then forming the polymer layer through polymerization on the surface of the oxide film.

DESCRIPTION OF THE PREFERRED EMBODIMENTS

Figure 1A:
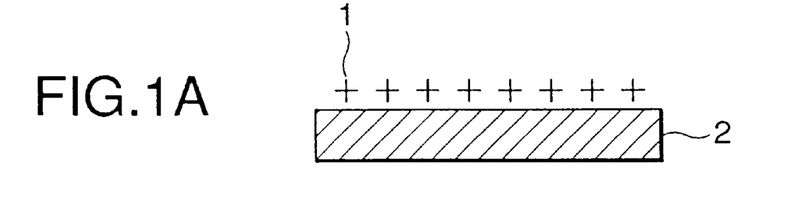
FIGS. 1A to 1D show schematic cross-sections of a capacitor element prepared by the present invention to illustrate the physicochemical state of an oxide membrane when an electroconductive polymer layer is formed thereupon.
Figure 1B:
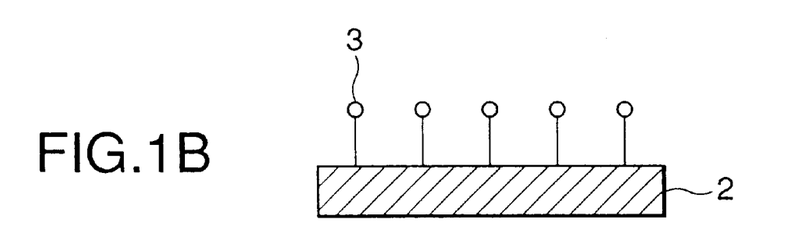
Figure 1C:
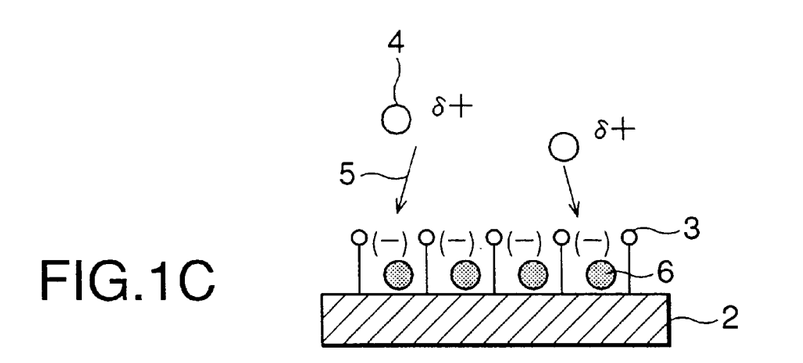
Figure 1D:
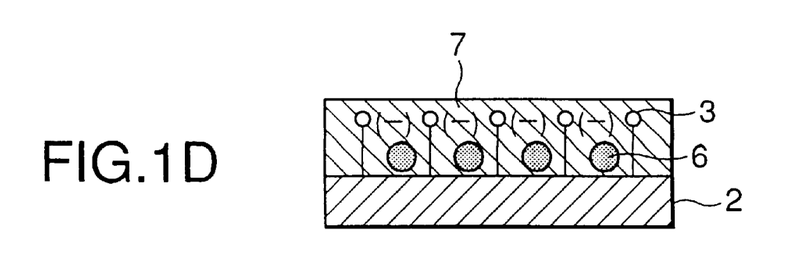

The principle of this invention will be presented below with reference to FIG. 1 for illustration. An oxide film 2 upon which is generated a zeta potential as illustrated in FIG. 1A is so modified as to grow profusely, on its surface, hydrophobic groups 3 (FIG. 1B) such as those of a silyciating agent like spores of fungi. Then, as shown in FIG. 1C, anionic substances 6 such as an anionic surfactant are allowed to be held among the hydrophobic groups on the oxide film 2, and then in a monomer solution, an electroconductive polymer layer 7 is allowed to form through oxidized polymerization, During polymerization, as shown in FIG. 1C, positive radicals 4 or an activator of polymerization are attracted towards the surface of the oxide film 2 owing to the electrostatic attracting force 5 from anionic substances 6 held among hydrophobic groups 3. Under this condition, polymerization proceeds selectively close to the surface of the oxide film 2, which ensures the efficient and selective formation of an electroconductive polymer layer 7 in contact with the surface of oxide film 2 as shown in FIG. 1D. This arrangement further reduces formation of immature polymer clusters, and improves the effective coating of the oxide membrane, thereby dissolving the three problems discussed above.

This invention can reduce the formation of immature polymer clusters on the surface of an oxide film. This gives three merits to the resulting capacitor: the first one is attainment of a specified capacitance; the second is inhibition of changes in capacitance associated with changes in humidity of the atmosphere which may attach or detach to and from the capacitor according to a given climatic condition; and the third is avoidance of lowered reliability resulting from the deteriorated insulation of the oxide film with immature polymer clusters which is invaded by impurity ions contained in moisture in atmosphere.

The method for the production of the solid electrolyte capacitor which this invention provides consists of exposing the positive body formed on the oxide film to a steam comprising hydrophobic groups, or immersing it in a solution containing the hydrophobic groups or spraying the solution onto it, thereby modifying the body with the hydrophobic groups, and then, of exposing it to a steam comprising an anionic substance or immersing it in a solution comprising the anionic substance or spraying the solution to it.

Appropriate hydrophobic groups will be mentioned as an illustration.

(1) Silyl Introducing Agent

γ-glycidoxypropyltrimethoxysilan, γ-glycidomethyldiethoxysilan, γ-glycidoxypropyltriethoxysilan, γ-methacryloxypropylemthyldiethoxysilan, γ-methacryloxypropylmethyldiethoxysilan, γ-methacryloxypropyltrimethoxysilan, vinyltrimethoxysilan, vinyltriethoxysilan, vinyltris (β-methoxyethoxy)silan, β-(3,4 epoxycyclohexyl) ethyltrimethoxysilan, and γ-methylcaptopriltrimethoxysilan.

(2) Titanium Introducing Agent

Isopropyltriisostearoyltitanate, isopropyltridecilbenzenesulfonyltitanate, isopropyltris (dioctylpyrrophosphate)titanate, triisopropylbis (dioctylphosphite)titanate, tetraisopropylbis (dioctylphosphite)titanate, tetra (2,2-dialyloxymethyl-1-butyl)bis(di-tridecil)phosphite titanate, bis (dioctylpyrrophosphate)oxyacetatetitanate, bis (dioctylpyrrophosphate)ethylenetitanate, isopropyltrioctanoyltitanate, isopropyldimethalylisosteroyltitanate, isopropylisosteroyldiacryltitanate, isopropyltri (dioctylphosphate)titanate, and isopropyltricmylphenyltitanate.

(3) Aluminum Introducing Agent

Acetoalcoxyaluminumdiisopropylate

The above-mentioned hydrophobic groups allow anionic substance to stay on the surface of an oxide film as discussed above, but they also have a property to enhance the adherence of an electroconductive polymer layer onto the oxide film as is disclosed in Japanese Unexamined Patent Publication No. 2-74021 or No. 4-73924.

Appropriate anionic substances will be mentioned as an illustration.

(1) Fatty Acids

Formic acid, acetic acid, propionic acid, acetic acid, valeric acid, caproic acid, capric acid, lauric acid, myristic acid, palmitic acid, stearic acid, oleic acid, and behenic acid.

(2) Aromatic Carboxylic Acid

Benzoic acid, oxalic acid, acrylic acid, toluic acid, and phthalic acid.

(3) Anionic Surfactants (Carboxylic Acid Salts)

sodium laureate, and sodium propionate (4) Anionic Surfactants (Sulfonates)

Sodium isopropylnaphthalenesulfonate, sodium butylnaphthalenesulfonate, sodium dodecilsulfonate, and sodium dodecilbenzenesulfonate (5) Phenol and its Derivatives Phenol and p-phenol sulfonate Of the anionic substances described above, the anionic surfactant is used in above-described Japanese Unexamined Patent Publication Nos. 3-64013 and 3-64014 as an agent which improves the adherence of an electroconductive layer on the surface of the dielectrix oxide film. The inventions disclosed in those publications apply those anionic surfactants as an agent solely for the improvement of the wettability of the oxide film, and use them alone by dissolving them in the electroconductive polymer reaction solution, or by applying it on the oxide film before polymerization. In this invention, however, the anionic substances including anionic surfactants are applied, after the oxide film has been modified with hydrophobic groups, on that oxide film so that they may, in collaboration with the hydrophobic groups, attract positive radicals or polymerization activators towards the surface of the oxide film through electrostatic force. Thus, in this invention, the surfactant exerts its effect only after it has been held among the hydrophobic groups stabilized on the oxide film.

The anionic substance held among hydrophobic groups stabilized on the surface of the oxide film is adequate for the purpose when it has a thickness corresponding to that of monolayer or a few layers. The anionic substance having a too large thickness would be inconvenient because it would bring adverse effects such as reduction in efficiency and loss of capacitance. Accordingly, it is important to prepare a thin film comprising hydrophobic groups and anionic substance evenly in a reproducible manner. The method allowing the formation of such film consists of exposing a positive body upon which an oxide film has been formed, to a steam comprising hydrophobic groups, or immersing it in a solution containing hydrophobic groups, and then of exposing the positive body to a steam comprising an anionic substance or immersing it in a solution containing the anionic substance.

The embodiments of this invention will be detailed below with reference to figures.

EXAMPLE 1

A sintered tantalum anode body (about 50% porosity) in the form of a cylinder with 1 mm in diameter and 1 mm in height is submitted to positive oxidation in a phosphate aqueous solution under 15V voltage, washed and dried to produce a sintered tantalum body whose surface has been coated with a dielectric oxide film. The sintered anode body, when measured in a phosphate aqueous solution, gave a capacitance of 10.2 $\mu$F. Then, this sintered tantalum body was immersed in a solution comprising 30M γ-glycidopropyltrimethoxysilan/hexadecan for one hour, removed from the solution, exposed to air for dryness, and immersed in purified water for 30 minutes for cleaning. The body was then immersed in an aqueous solution of 20 mM dodecilsulfonate for 30 minutes, removed from the solution, and left in the air of 100° C. for 30 minutes for dryness. The thus obtained element was immersed in a methanol solution maintained at −40° C. which contained 10 wt. % pyrrol and, as an oxidizing agent, 30 wt. % iron chloride, for three minutes, removed from the solution, left at room temperature for 20 minutes to encourage polymerization, and immersed in methanol for 30 minutes for cleaning. The same operation was repeated ten times, to produce an electroconductive polymer layer. Then, a graphite layer and a silver paste layer were laid upon in this order to produce a complete capacitor element.

EXAMPLE 2

The element which had an oxide membrane formed thereupon by the same method as in Example 1 was immersed in a solution of 2 mM isopropyltriisostearoyltitanate in alcohol for ten minutes, removed therefrom and left at room temperature for 30 minutes. Then, the element was immersed in an aqueous solution of 3 mM dodecilsulfonate for ten minutes, and further immersed for 30 minutes, to form on the surface of the element an oxide film which was so modified at to hold isopropyltriisostearoyltitanate or hydrophobic groups and stabilize among those hydrophobic groups dodecilbenzene sulfonate or an anionic substance.

Later, the element was allowed to have an electroconductive polymer layer and a negative electrode layer in the same manner as in Example 1, to produce a capacitor element.

EXAMPLE 3

The element which had an oxide film formed thereupon by the same method as in Example 1 was immersed in a solution of 2 mM acetoalcoxylaluminumisopropylate in alcohol for ten minutes, removed therefrom and left at room temperature for 30 minutes. Then, the element was immersed in an aqueous solution of 3 mM dodecilsulfonate for ten minutes, and further immersed for 30 minutes, to form on the surface of the element an oxide film which was so modified at to hold acetoalcoxylaluminumisopropylate or hydrophobic groups and stabilize among those hydrophobic groups dodecilbenzene sulfonate or an anionic substance.

Later, the element was allowed to have an electroconductive polymer layer and a negative electrode layer in the same manner as in Example 1, to produce a capacitor element.

EXAMPLE 4

The element which had an oxide film formed thereupon by the same method as in Example 1 was immersed in a solution of 2 mM γ-glycidopropylmethoxysilan in alcohol for ten minutes, removed therefrom and left at room temperature for 30 minutes. Then, the element was immersed in an aqueous solution of 3 mM dodecilsulfonate for ten minutes, and further immersed for 30 minutes, to form on the surface of the element an oxide film which was so modified at to hold γ-glycidopropylmethoxysilan or hydrophobic groups and stabilize among those hydrophobic groups dodecilbenzene sulfonate or an anionic substance.

Later, the element was allowed to have an electroconductive polymer layer and a negative electrode layer in the same manner as in Example 1, to produce a capacitor element.

EXAMPLE 5

The element which had an oxide film formed thereupon by the same method as in Example 1 was immersed in a solution of 30 mM γ-glycidopropylmethoxysilan/hexadecan in alcohol for ten minutes, removed therefrom and left at room temperature for 30 minutes. Then, the element was immersed in an aqueous solution of 3 mM dodecilsulfonate for ten minutes, and further immersed for 30 minutes, to form on the surface of the element an oxide film which was so modified at to hold butylnaphtalensulfonate or hydrophobic groups and stabilize among those hydrophobic groups phthalic acid or an anionic substance.

Later, the element was allowed to have an electroconductive polymer layer and a negative electrode layer in the same manner as in Example 1, to produce a capacitor element.

EXAMPLE 6

The element which had an oxide membrane formed thereupon by the same method as in Example 1 was exposed to a steam of γ-glycidopropyltrimethoxysilan for one hour, removed therefrom and left at room temperature for 30 minutes. Then, the element was exposed to a steam of dodecilsulfonate for ten minutes, and further left at room temperature for 30 minutes, to form on the surface of the element an oxide film which was so modified at to hold butylnaphthalenesulfonate or hydrophobic groups and stabilize among those hydrophobic groups dodecilbenzene sulfonate or an anionic substance.

Later, the element was allowed to have an electroconductive polymer layer and a negative electrode layer in the same manner as in Example 1, to produce a capacitor element.

EXAMPLE 7

The element which had an oxide membrane formed thereupon by the same method as in Example 1 was exposed to a steam of γ-glycidopropyltrimethoxysilan for one hour, removed therefrom and left at room temperature for 30 minutes. Then, the element was exposed to a steam of dodecilsulfonate for ten minutes, and left at room temperature for 30 minutes, to form on the surface of the element an oxide film which was so modified at to hold butylnaphthalenesulfonate or hydrophobic groups and stabilize among those hydrophobic groups dodecilbenzene sulfonate or an anionic substance.

The element was then immersed in an aqueous solution of 30 wt. % potassium dichromate for five minutes, transferred and immersed in a solution containing 5 wt. % aniline and p-toluenesulfonate at room temperature for five minutes, and left in the air for 30 minutes to encourage polymerization. The procedure comprising addition of an oxidizing agent, exposure to a solution containing aniline monomer and p-toluenesulfonate, and polymerization were repeated five times to produce a polyaniline layer black in color.

Later, the element was allowed to have a negative electrode layer in the same manner as in Example 1, to produce a capacitor element.

Comparison 1

In this comparative example, a tantalum capacitor element which had an oxide film formed by a conventional method was immersed in a solution containing monomer units as in Example 1 immediately after the oxide film had been formed, to allow oxidized polymerization to proceed. Then, by the same method as in Examples 1 and 2, a negative electrode layer was formed. On the finished capacitor element its coat coverage and percent change in capacitance were measured.

Comparison 2

In this comparative example, an element which had an oxide film formed by the same method as in Example 1 was immersed in a solution of 30 mM γ-glycidopropylmethoxysilan/hexadecan for ten minutes, and left at room temperature for 30 minutes, to form on the surface of the element an oxide membrane which was so modified at to hold γ-glycidopropylmethoxysilan or hydrophobic groups.

The capacitor elements obtained in Examples 1–7 and Comparisons 1 and 2 were left in an atmosphere of 5% or less RH and 125° C. for 24 hours, and their capacitance was measured. Then, they were left in another atmosphere of 95% or more RH, and 65° C. for 24 hours, and their capacitance was measured. The percent change in capacitance was also measured. The capacitance an element gave when it, after having had an oxide film formed thereupon, was immersed in an aqueous solution of phosphate was taken as 100, and the capacitance the element gave when it was exposed to above condition (125° C./24 hours) was taken as representative of the coat coverage of the element. The results are given in Table 1.

The capacitor elements obtained in Examples 1–7 and Comparisons 1 and 2 were further submitted to an endurance test comprising exposure to humidity for 1000 hours. This test comprises a comparison between the leak currents before and after the test. Five samples were tested for each Example and Comparison. The results are given in FIGS. 2A and 2B.

TABLE 1

| Sample | A<br>Capacitance<br>in phosphate<br>solution<br>($\mu$F) | B<br>Capacitance<br>at 125° C.<br>($\mu$F) | C<br>Capacitance<br>at 65° C.<br>and 95% RH<br>($\mu$F) | D*1)<br>Coat<br>cov-<br>erage<br>(%) | E*2)<br>Percent<br>change in<br>capacitance<br>(%) |
|---|---|---|---|---|---|
| Example 1 | 10.2 | 9.9 | 10.2 | 97.1 | 2.9 |
| Example 2 | 9.7 | 9.2 | 9.6 | 94.8 | 4.1 |
| Example 3 | 10.4 | 9.3 | 10.3 | 89.4 | 9.6 |
| Example 4 | 9.8 | 9.1 | 9.7 | 92.8 | 6.i |
| Example 5 | 9.6 | 9.2 | 9.5 | 95.8 | 3.1 |
| Example 6 | 10.0 | 9.5 | 10.0 | 95.0 | 5.0 |
| Example 7 | 10.4 | 9.9 | 10.4 | 95.2 | 4.8 |
| Comparison 1 | 9.9 | 7.1 | 9.5 | 71.7 | 24.2 |
| Comparison 2 | 10.1 | 7.6 | 9.9 | 75.2 | 22.7 |

Note)
*1Coat coverage D = B/A × 100 (%)
*2Percent change in capacitance E = (C − B)/A × 100 (%)

Comparison of the results from Comparison 1 and those from Examples 1–7 in Table 1 indicates that, although Comparison 1 gave a coat coverage of 70–75%, the corresponding value from Examples 1–7 was 90–95%. Particularly, the element which had its oxide membrane so modified as to hold γ-glycidopropyltrimethxysilan as hydrophobic groups and to stabilize dodecilsulfonate or an anionic surfactant among the hydrophobic groups had a coat coverage as high as 97%. The same also was ascertained for percent change in capacitance: Comparison 1 gave the percent change in capacitance of 24% while the corresponding value was 10% or less for Examples 1–7. This indicates that the elements from Examples are superior in capacitance stability to those from Comparisons.

The element from Comparison 2 which held γ-glycidopropyltrimethoxysilan or hydrophobic groups on its oxide film but did not stabilize among them any anionic substance gave 75.2% coat coverage and 22.7% change in capacitance. Although the performance is somewhat improved as compared with Comparison 2, it is still limited in its effectiveness when compared with the elements from Examples where anionic substance was allowed to stabilize among hydrophobic groups.

Figure 2A:
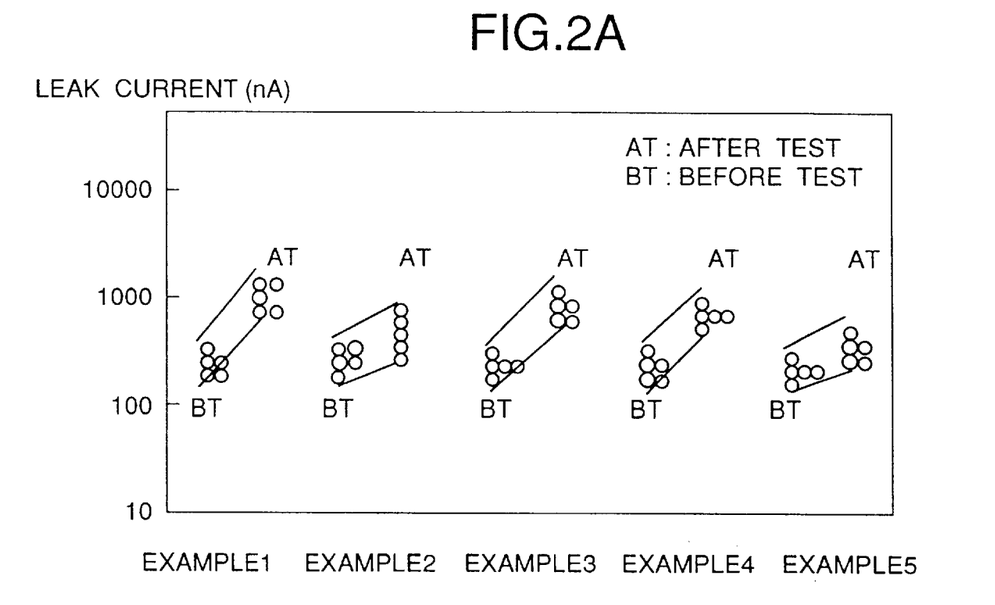
FIGS. 2A and 2B show characteristic diagram relating to the elements from Examples 1–7 which were prepared by the present method and those from Comparison 1 and 2 which were prepared by a conventional method, and gives a comparison of changes in leak current of two kinds of elements before and after an anti-humidity test.
Figure 2B:
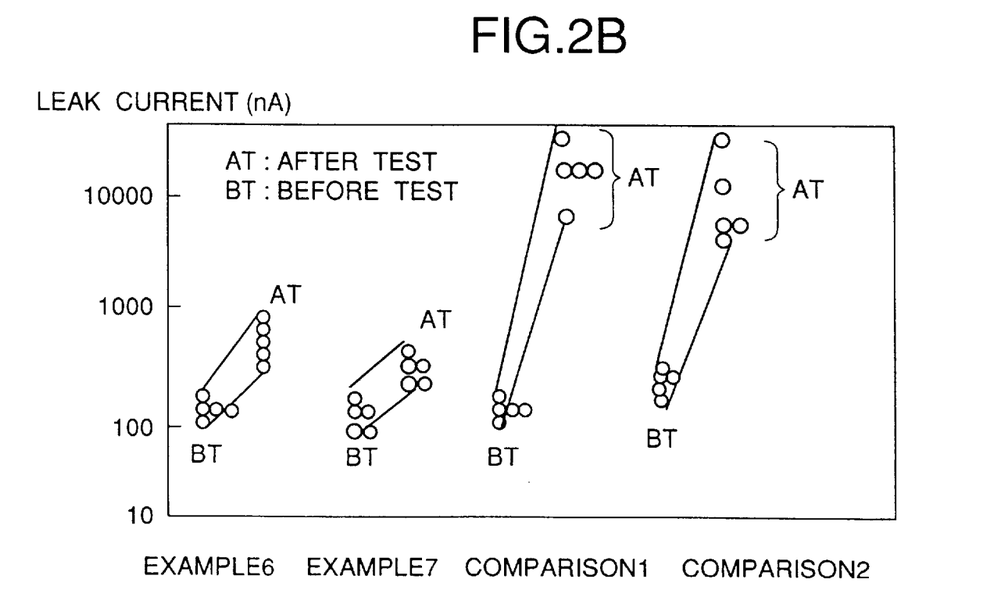

Another merit the capacitor of this invention provides or reliability of the product will be described with reference to FIGS. 2A and 2B. Comparison of the results from Comparisons 1 and 2, and those from Examples 1–7 indicates that, although leak current increased by 100–1000 times after the test in Comparisons 1 and 2, the corresponding increase was only two to three times for Examples 1–7. This suggests that, as discussed earlier, in the elements from Comparison, moisture adheres to the part of an oxide film where immature polymer clusters exist, impurities contained in that moisture migrate through the oxide film, and damage it thereby to increase leak current through the capacitor.

The advantage here concerned which this invention provides is not limited to polypyrrol but can be also obtained from polyaniline. Briefly, the advantage is not limited to any specific electroconductive polymers. Further, if an anionic substance which can also confer electroconductivity to a polymer when mixed therewith is employed, it will dispense with the addition of a dopant for polymerization, because that substance itself will act as a dopant.

EXAMPLE 8

This example was carried out to elucidate the following point: is it possible that an oxide film which is so modified as to hold hydrophobic groups on its surface and then to stabilize an anionic substance among the hydrophobic groups allows efficient formation of an electroconductive polymer thereupon?

In the same manner as in Examples 1 and 2, an anionic substance (dodecil sulfonate) was allowed to stabilize among hydrophobic groups (alklytrichlorosilan), and by the same method as in Example 1 an electroconductive polymer layer was formed through chemically oxidized polymerization. In this example, a graphite layer and silver paste layer were formed each time polymerization was allowed to occur. Of the resulting capacitor element, its capacitative characteristics were measured.

Comparison 3

In this comparative example, a sintered tantalum body, after having an oxide film formed, has an electroconductive polymer layer overlaid thereupon as in Example 1, and then a graphite layer and silver plast layer were further overlaid each time polymerization was allowed to occur. The results are shown in FIG. 3.

Figure 3:
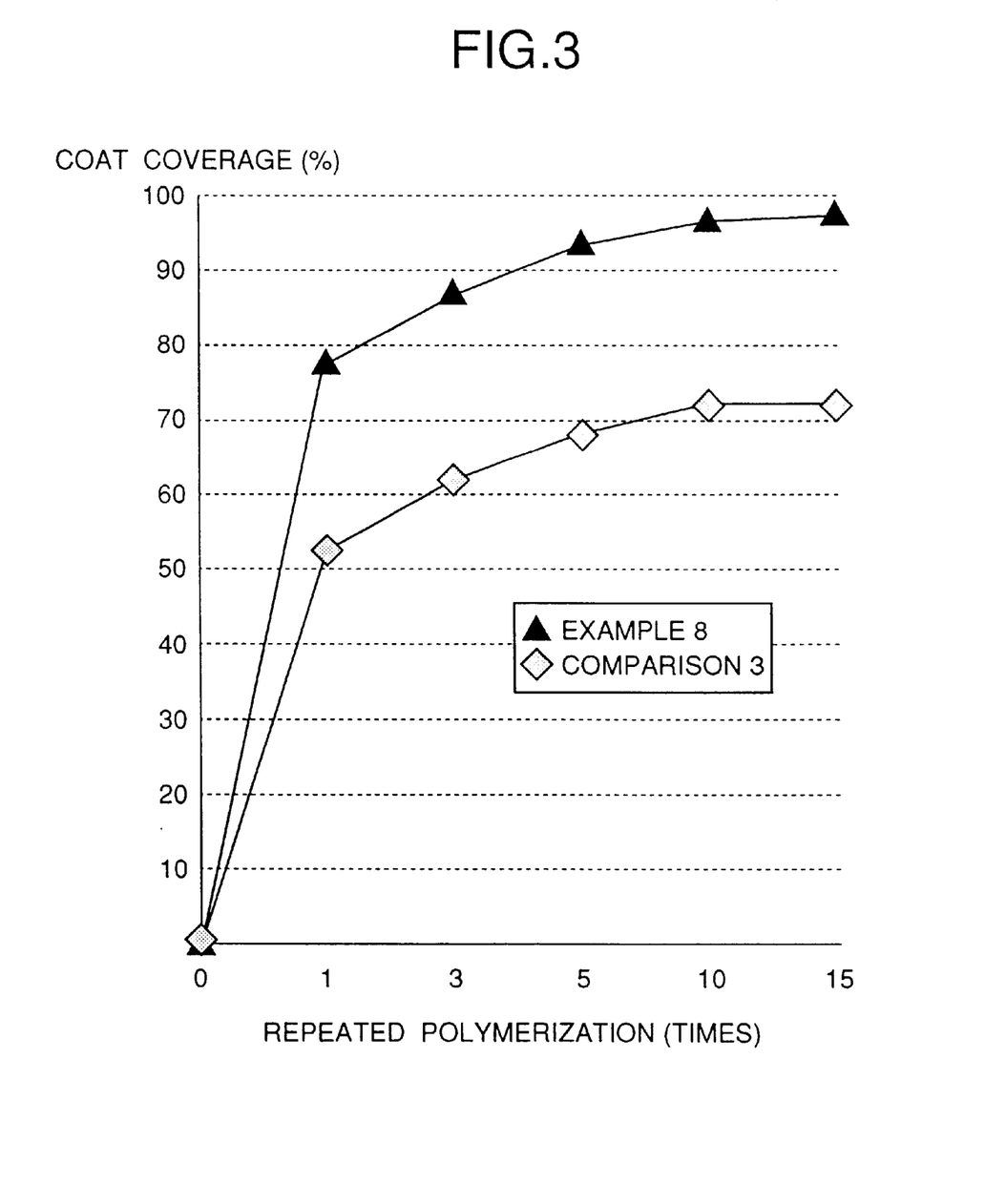
FIG. 3 shows a characteristic diagram relating to solid electrolyte capacitors prepared by the present method (Example 8) and a conventional method (comparison 3), and gives a comparison of efficiency in electroconductive polymer formation between the two kinds of capacitors.

Comparison of the results from Example 8 and Comparison 3 in FIG. 3 indicates that percent increase in capacitance for repeated polymerizations is increasing higher in Example 3 as compared with that of Comparison 3.

Above description was limited to the capacitor element which is produced after a sintered tantalum body has been exposed to a steam comprising a hydrophobic group or an anionic substance, or immerse in a solution containing a hydrophobic group or an anionic substance, thereby to modify an oxide membrane to hold hydrophobic groups thereupon and to stabilize the anionic substance among the groups, but this invention should not be limited to such elements. The method whereby a solution is applied evenly on the surface of a body includes further spraying of the solution onto the body, as is well known. It is needless to say that the latter method can also be applied for the fabrication of the capacitor element of this invention.

As described above, the solid electrolyte capacitor of this invention is characterized by forming a layer comprising hydrophobic groups and an anionic substance between a dielectric oxide film and an electroconductive polymer layer, in contrast with a conventional capacitor incorporating the electroconductive polymer as a solid electrolyte.

Adopting this structure, the capacitor element of this invention is improved in its coat coverage, and thus this invention provides a solid electrolyte capacitor which ensures three merits: attainment of a specified capacitance, reduced capacitance change, and high reliability.

The method for producing a solid electrolyte capacitor which this invention provides consists of exposing a positive electrode body upon which an oxide film has been formed, to a steam or a solution or a mist of a hydrophobic group, thereby to modify the membrane, and then exposing the membrane to a steam or a solution of a mist of an anionic substance.

By this method, this invention allows the hydrophobic group and the anionic substance, regardless of their kind and nature, to be thinly and evenly applied onto the oxide film. Therefore, this invention ensures production of a solid electrolyte capacitor having a large coat coverage which determines its effective capacitance.

What is claimed is:

1. A method for producing a solid electrolyte capacitor comprising:

a first step of forming an oxide film on a surface of an anode body of a value metal;

a second step of modifying a surface of said oxide film with hold hydrophobic groups;

a third step of allowing an anionic substance to exist among said hydrophobic groups; and a step of allowing monomer units to polymerize on said oxide film so as to form an electroconductive polymer layer thereupon.

2. A method for producing a solid electrolyte capacitor according to claim 1, wherein said anionic substance acts also as a dopant which can confer electroconductivity to said electroconductive polymer compound.

3. A method for producing a solid electrolyte capacitor according to claim 1, wherein said first step consists of immersing said oxide film in a solution containing hydrophobic groups.

4. A method for producing a solid electrolyte capacitor according to claim 1, wherein said first step consists of exposing said oxide film to a steam of the compound with the hydrophobic group.

5. A method for producing a solid electrolyte capacitor according to claim 1, wherein said first step to consists of spraying a solution containing the hydrophobic groups onto said oxide film.

6. A method for producing a solid electrolyte capacitor according to claim 1, wherein said second step consists of immersing said oxide film in a solution containing said anionic substance.

7. A method for producing a solid electrolyte capacitor according to claim 1, wherein said second step consists of exposing said oxide film to a steam of a solution containing said anionic substance.

8. A method for producing a solid electrolyte capacitor according to claim 1, wherein said second step consists of spraying a solution containing said anionic substance onto said oxide film.

* * * * *